D. P. CARR.
STONE PICKING MACHINE
APPLICATION FILED AUG. 6, 1919.
1,381,540.
Patented June 14, 1921.
4 SHEETS—SHEET 2.
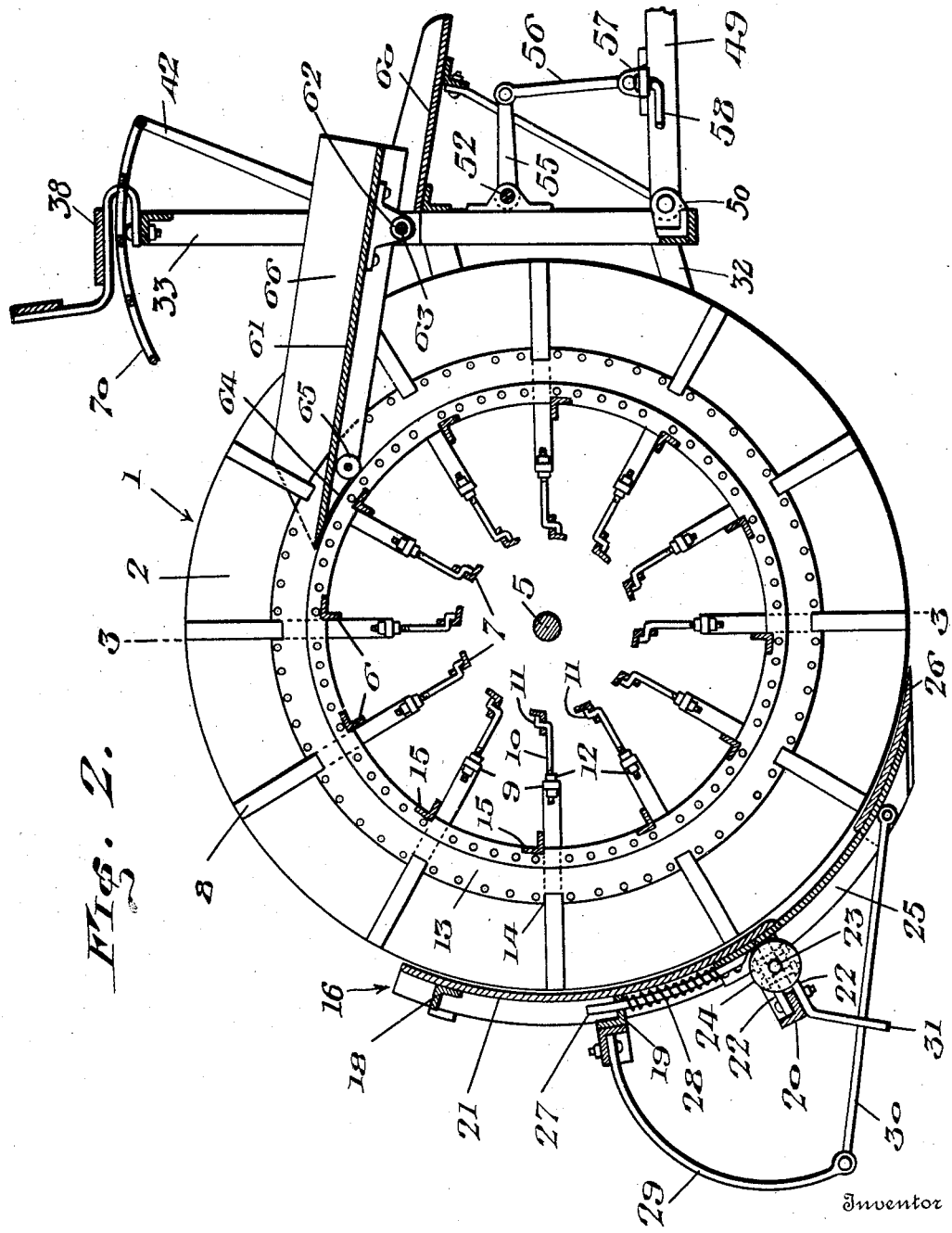

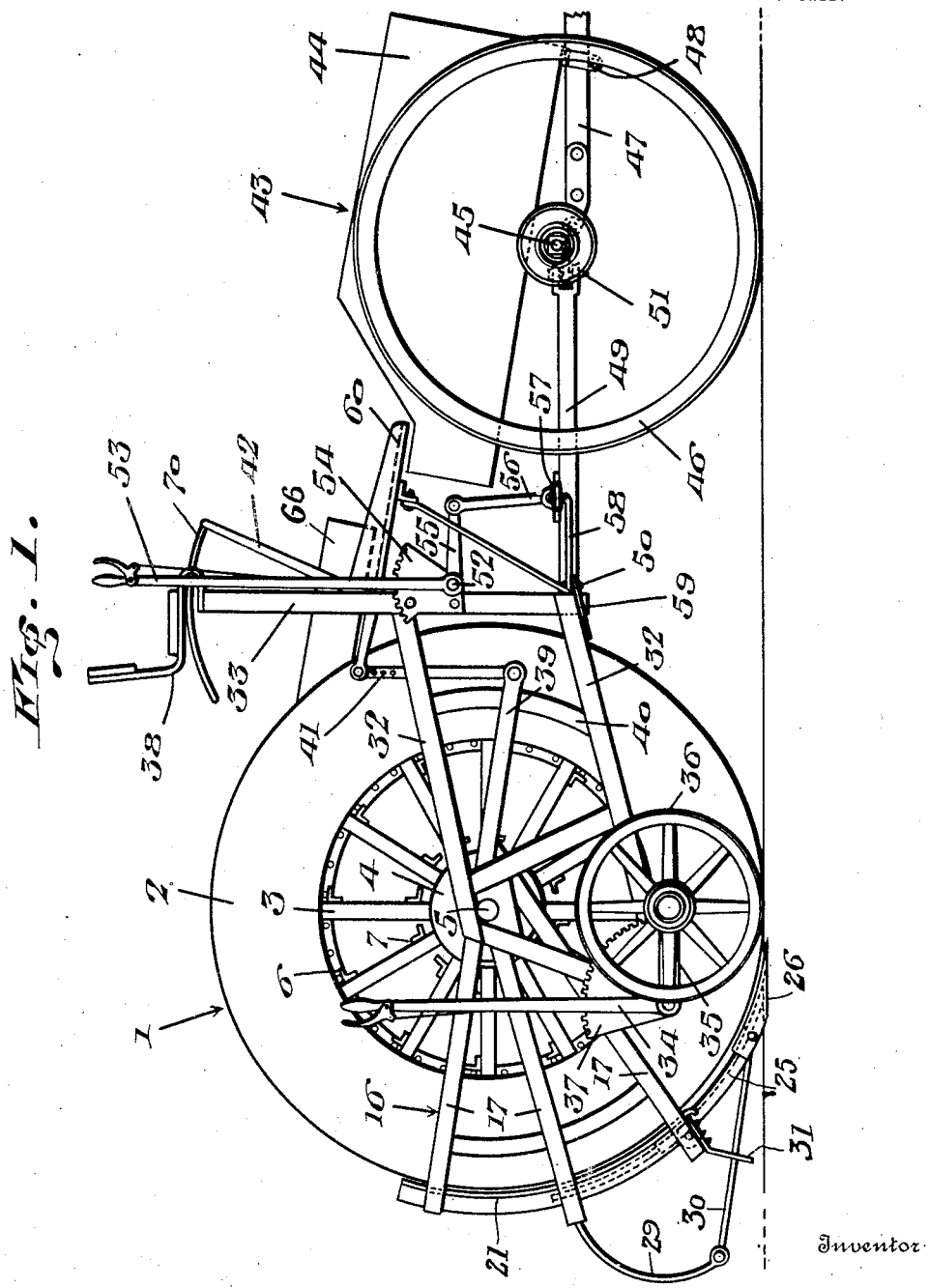

D. P. CARR.
STONE PICKING MACHINE
APPLICATION FILED AUG. 6, 1919.
1,381,540.
Patented June 14, 1921.
4 SHEETS—SHEET 3.
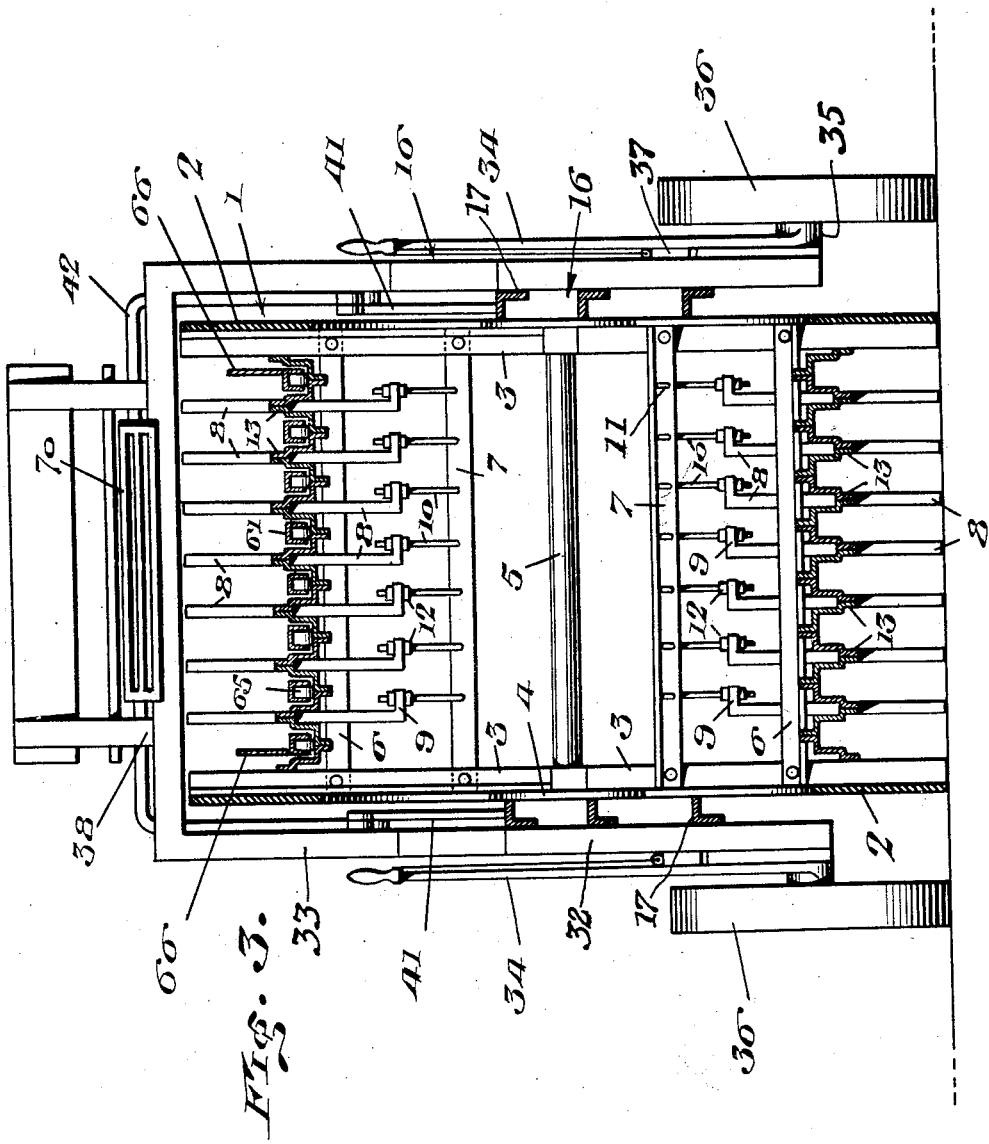

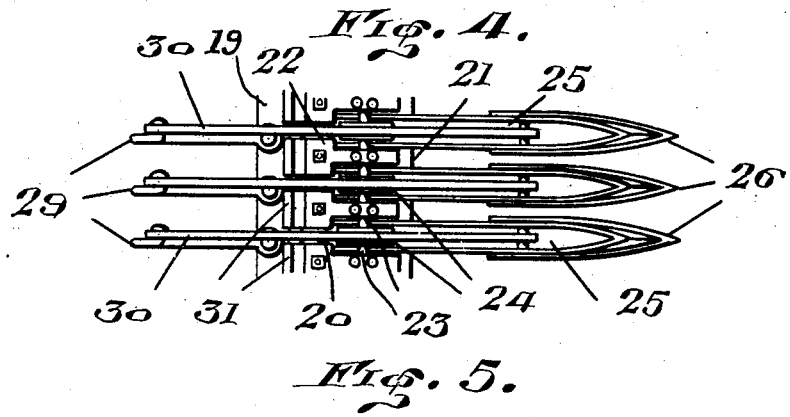

UNITED STATES PATENT OFFICE.

DON P. CARR, OF HOMER, MICHIGAN.

STONE-PICKING MACHINE.

1,381,540.  Specification of Letters Patent.  Patented June 14, 1921.

Application filed August 6, 1919. Serial No. 315,662.

*To all whom it may concern:*

Be it known that I, DON P. CARR, a citizen of the United States, residing at Homer, in the county of Calhoun and State of Michigan, have invented certain new and useful Improvements in Stone-Picking Machines; and I do hereby declare the following to be a full, clear, and exact description of the invention, such as will enable others skilled in the art to which it appertains to make and use the same.

The present invention relates to a machine for picking up or gathering stones from the ground and collecting them in a cart or other receptacle, and it is the primary object of the invention to provide a novel and improved machine of that character.

One of the more specific objects of the invention is the provision of a stone elevating cylinder of novel and improved construction and having adjustable teeth or fingers for catching and raising the stones as the cylinder rolls over the ground.

Another object is the provision of novel and improved deflecting means including a concave in rear of the cylinder and yieldable teeth extending under the cylinder to move over the ground for deflecting the stones upwardly so as to be elevated by the cylinder, said teeth being yieldable in order that they can yield should they strike non-yielding obstructions, thereby avoiding damage to the machine, and enabling it to pass over large stones or other obstructions which will not yield.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein :—

Figure 1 is a side elevation of the machine.

Fig. 2 is an enlarged longitudinal vertical section, portions being broken away.

Fig. 3 is a cross section taken on substantially the line 3—3 of Fig. 2.

Fig. 4 is a fragmentary bottom view of some of the deflecting teeth or fingers.

Fig. 5 is a front view of the machine with the cart removed.

In carrying out the invention, there is employed a stone elevating cylinder 1 of any suitable size and adapted to roll over the ground. This cylinder has annular side plates 2 that serve to retain the stones on the periphery of the cylinder and prevent them from rolling out the sides, and said plates 2 are secured to spokes 3 at the opposite sides of the cylinder and connected to hubs 4 that are mounted on a suitable transverse axle 5. An annular set of transverse bars 6 is secured to the opposite spokes 3 at the inner edges of the plates 2, and a similar set of bars 7 is also secured to said spokes between the axle 5 and bars 6, said bars being provided to carry the radial teeth or fingers 8 arranged in transverse rows or sets between the side plates 2. These fingers 8 extend across the bars 6, and are provided at their inner ends with angularly-extending ears 9 through which adjusting rods 10 extend, the inner ends of said rods being formed into hooks 11 to engage through apertures in the inner bars 7 and nuts 12 are disposed on the rods 10 at the opposite sides of the ears 9 to retain the fingers 8 in their adjusted positions, and to enable said fingers to be adjusted radially outward and inward so as to operate effectively. The nuts 12 can be threaded on the rods 10 for readily adjusting the fingers. Rings 13 of sheet metal surround the bars 6, and are arranged in pairs between the annular series of fingers 8, said rings having their inner and outer edges offset and riveted or otherwise secured together, as seen in Fig. 3. The fingers 8 are slidable between the rings and through notches 14 provided in the outer edges of the rings, while the inner edges have notches 15 engaging the bars 6 to secure said rings to the frame of the cylinder, and thus move the fingers 8 with the frame. The ring 13 provide the periphery of the cylinder, and form annular grooves or channels between which the fingers 8 are located, and the stones bear on said rings or grooved periphery of the cylinder, being raised by the fingers as they move upwardly in rear of the axle 5.

A rearwardly extending deflector frame 16 is carried by the axle 5 for oscillating movement, and includes rearwardly diverging bars 17, connected at their rear ends by the cross bars 18, 19 and 20, which are arranged immediately in rear of the cylinder. The cross bars carry a curved plate or concave 21 which is disposed close to the edges of the plates 2 and outer ends of the fingers 8, so as to retain the stones in place while being raised by the cylinder. Plates or pieces 22 are disposed between and secured to the lower edge portion of the concave 21 and lower bar 20, and support a transverse axle 23 behind the lower edge of the concave, and a transverse series of rollers 24 are mounted on said axle between the plates 22 and between the cross bar 20 and concave. These rollers 24 serve to freely guide a transverse series of curved deflecting teeth 25 extending upwardly behind the concave 21 which are of U-shaped cross sections so as to straddle said rollers. Said teeth 25 are curved concentric with the cylinder and extend downwardly and forwardly from the lower edge of the concave to engage the ground, and removable shoes 26 are secured on the lower forward ends of said teeth to take the wear, said shoes being removable and replaceable when worn out. The teeth 25 are provided at their upper ends behind the concave with upwardly extending stems 27 extending slidably through the bar 19 to assist in guiding said teeth for upward and downward movement, and coiled wire expansion springs 28 are disposed on said stems and are confined between the bar 19 and teeth to yieldably move the teeth downward. This movement of the teeth to active position is also assisted by leaf spring 29 secured to the bar 19 and curved rearwardly and downwardly, the lower ends of the springs 29 being connected by links 30 with the lower portions of the teeth 25. Jointly, the springs 28 and 29 move the teeth 25 downwardly and forwardly, the rollers 24 permitting of easy movement of the teeth. The springs 28 push downwardly on the upper ends of the teeth, while links 30 are moved forwardly by the springs 29. The lower plates 22 have downwardly bent portions 31 between the rods 30 and serving to guide them for longitudinal movement. Should any of the teeth encounter an unyielding object, the teeth will be moved rearwardly and upwardly with respect to the cylinder, so as to pass over the obstruction, the springs 28 and 29 flexing or yielding to permit such movement of the tooth or teeth, and returning said tooth to active position after it has passed over the object. These teeth extend downwardly and forwardly under the rear portion of the cylinder, and as the cylinder rolls over the ground and stones thereon, the teeth will deflect the stones upwardly thereon, so that the fingers 8 of the cylinder will catch the stones and carry them upward along the concave 21, and as the stones move on top of the cylinder they bear on the rings 13, so that the concave 21 need not extend very far above the horizontal plane of the axle 5.

The main frame 32 of the machine has a vertical portion 33 in front of the cylinder, and said frame extends rearwardly and is mounted on the axle 5. The side portions of the frame 32 have fulcrumed thereto L-shaped levers 34, the lower arms 35 of which have ground wheels 36 journaled thereto at opposite sides of the cylinder, and said frame 32 has segments 37 for holding the levers 34 in various positions. When the levers 34 are swung rearwardly, the cylinder 1 is let down on the ground, and the wheels 36 can be adjusted so as to support the main weight of the cylinder, if desired, or can support the cylinder slightly above the ground. By swinging the levers 34 forwardly and downwardly, the cylinder will be raised up off of the ground, such as when the machine is moved from one place to another.

The upper end of the forward portion 33 of the frame carries a suitable seat 38 for the operator, and to enable the operator to manually raise and lower the gang or set of deflecting teeth 25 during the operation of the machine, the frame 16 is provided with a forwardly extending arm 39 at each side of the cylinder, movable along a guide 40 carried by the frame 32, and connected by a link 41 to a foot lever 42 fulcrumed on the frame portion 33. This lever 42 extends in front of the seat, to be operated by the foot of the operator. Thus, when the lever 42 is pushed forwardly, it will swing the arms 39 upwardly, to thereby press the deflecting teeth 25 against or into the ground with the desired pressure and tension, and when the pressure against the lever 42 is relieved, the teeth 25 in dragging on the ground will naturally swing rearwardly so as to simply bear on the ground due to the weight of the deflecting teeth on the supporting frame thereof.

A stone collecting cart 43 is provided in front of the cylinder for collecting the stones therein, and has a suitable body or receptacle 44 mounted on an axle 45 carried by wheels 46 in the paths of which the wheels 36 move. A tongue 47 is connected to the axle 45 for pulling the cart and cylinder, and is pivotally connected to the axle, to permit the body 44 to be swung rearwardly for dumping the stones therefrom, when the cart is detached from the remainder of the machine. A clip 48 of any suitable kind is carried by the forward end of the body 44 to attach the body to the tongue 47, to prevent premature dumping.

In order to hitch the frame 32 to the cart, a forwardly extending tongue 49 has its rear end pivoted to a hinge member 50 carried by the lower end of the portion 33 between the sides of the frame 32, and the forward end of the tongue 49 is connected by a vertical pivot 51 with the axle 45, thus permitting the cart to turn sidewise in steering the machine. By removing the pivot 51, the cart is readily removed from the cylinder, and the tongue 49 will bear on the ground, to support the forward end of the frame 32, while the cart is being hauled to the place for dumping the stones.

The tongue 49 is also used as a means for raising and lowering the forward portion of the main frame 32, and for this purpose, a transverse rock shaft 52 is carried by the frame portion 33, and has an upwardly extending hand lever 53 at one side of the seat 38, a segment 54 being provided on the portion 33 to hold the lever 53 in various positions. The shaft 52 has a forwardly extending arm 55 connected by a link 56 with a casting 57 secured on the tongue 49, so that lever 53 can be swung to swing the tongue 49 relatively to the frame 32, and said tongue being supported at its forward end by the axle 45 of the cart, will result in the joint between the tongue 49 and frame 32 moving upwardly or downwardly as the lever 53 is swung. The forward end of the frame 32 can thus be raised and lowered during the operation of the machine, which will also change the relation of the deflector frame 16 to the frame 32. The casting 57 is connected by hounds 58 with castings 59 at the lower corners of the frame portion 33, thus holding the tongue 49 at right angles to the frame 32.

A chute 60 is carried by the frame portion 33 and extends forwardly and downwardly to overhang the rear end of the body 44 of the cart, for directing the stones into the cart. The stones are removed from the top of the cylinder as they pass forwardly, by means of stripping or deflecting fingers 61. These stripping fingers 61 are of inverted U-shaped cross section and extend rearwardly and upwardly at a slight angle with their rear ends disposed within the annular grooves or channels of the cylinder between the rings 13. The forward portions of the fingers 61 are secured over brackets 62 that are mounted for oscillation on a transverse rod 63 carried by the frame portion 33 in front of the cylinder, permitting said fingers to oscillate vertically should the drum be uneven. The rear ends of the fingers 61 are curved or cut off, as at 64, to conform to the rings 13, and rollers 65 mounted within the rear end portions of the fingers 61 bear on the rings 13 to reduce friction. The forward ends of the fingers 61 overhang the chute 60, and the fingers 8 move between the fingers 61, so that the stones will move from the top of the cylinder over onto the fingers 61 so as to roll down said fingers and chute 60 into the cart. Upstanding side plates 66 are secured to the end fingers 61 of the transverse set, to prevent the stones rolling off to the side, In operation, the machine is pulled over the ground by draft animals, and is run over the field back and forth to pick up the stones, which are a hindrance to cultivation of the land. Ordinarily, the picking up of stones, which prevail in certain sections of the country, involves considerable labor and time, whereas the present machine enables the work to be done at small cost and conveniently. If the stones are not thick on the ground, they can be first raked, or scraped into rows, and the machine simply pulled over the rows, thus reducing the number of times that the machine must be moved over the field. In moving over the ground, the cylinder 1 rolls over the stones, bringing the fingers 8 between them, and the deflecting teeth 25 will deflect the stones upwardly as they are pushed rearwardly and upwardly with the fingers 8, said teeth 25 yielding as necessary, and being moved down against or into the ground by pushing the foot lever 42 forwardly. When the stones are carried over the cylinder, they are stripped therefrom by the fingers 61 and roll down into the cart in which the stones are collected. The cart can be dumped from time to time, by detaching it and hauling the stones to the hole or place where the stones are to be dumped. The cart is then returned and attached to the remainder of the machine, and the operation is continued.

By adjusting the lever 53, this will change the angular position of the frame 32 about the axle 5, enabling the inclination of the stripping fingers 61 to be changed. Said fingers can thus be set at different angles of inclination according to the circumstances.

It is preferable to provide the upper foot piece of the foot lever 42 with an arcuate ladder extension 70 projecting rearwardly under the seat 38, and providing a series of rungs or foot pieces which can be successively moved or shoved forwardly by the feet, for obtaining a greater movement of the foot lever in a convenient manner. This is especially desirable when the drum is of large diameter, and the movement of the deflecting device considerable.

Having thus described the invention, what is claimed as new is:—

1. A gathering machine embodying a cylinder to roll over the ground and having fingers for raising objects, yieldable deflecting teeth extending downwardly and forwardly under the cylinder to drag over the ground and deflect the objects upwardly, and rearwardly extending stripping fingers bearing on top of the cylinder between the fingers thereof for removing the objects from the cylinder.

2. A gathering machine embodying a cylinder to roll over the ground having fingers projecting therefrom, a concave in rear of the cylinder to retain objects thereon while being elevated, and deflecting teeth extending downwardly and forwardly from the lower edge of the concave under the cylinder and yieldable toward the concave.

3. A gathering machine embodying a cylinder to roll over the ground having outwardly extending fingers, a concave disposed in rear of the cylinder to retain objects thereon while being elevated, curved deflecting teeth extending behind the concave and downwardly and forwardly under the cylinder, means in rear of the concave for guiding said teeth for movement toward and away from the concave, and spring means for moving said teeth yieldably downward and forward.

4. A gathering machine embodying a cylinder to roll over the ground having outwardly extending fingers, a concave in rear of the cylinder for retaining objects thereon while being elevated, curved deflecting teeth extending behind the concave and downwardly and forwardly under the cylinder, guides for said teeth in rear of the concave, expansion springs behind the concave yieldably moving the teeth downward, leaf springs extending rearwardly and downwardly from the concave, and links connecting the leaf springs and teeth to push the lower portions of the teeth forwardly.

5. A gathering machine embodying an axle, a cylinder mounted on said axle to roll over the ground and having outwardly extending fingers, a concave in rear of the cylinder, to retain objects on the cylinder while being elevated, and a set of individually yieldable deflecting teeth extending downwardly and forwardly from the lower edge of the concave under the cylinder and movable longitudinally of themselves.

6. A gathering machine embodying a cylinder to roll over the ground having a peripheral portion provided with annular grooves, fingers extending outwardly from between said grooves, stripping fingers pivoted to the frame extending into said grooves for stripping the objects from the cylinder, and rollers pivoted to the stripping fingers and working in said grooves.

7. A gathering machine embodying a cylinder having a peripheral portion with annular grooves, radial fingers extending slidably through said peripheral portion between the grooves, and means within said peripheral portion for adjusting said fingers outwardly and inwardly.

8. A gathering machine embodying a cylinder including a series of rings with offset edges secured together and providing annular grooves, and fingers extending outwardly between said rings and grooves formed thereby.

9. A gathering machine embodying a cylinder to roll over the ground and including a series of rings having offset edges secured together to constitute the periphery of the cylinder, said cylinder having bars over which the inner edges of said rings are engaged, fingers extending slidably outward between the outer edges of the rings, and means within the rings for adjusting said fingers outwardly and inwardly.

10. A gathering machine embodying a cylinder having outwardly extending fingers for elevating objects and having annular grooves between said fingers, a frame, stripping fingers pivotally mounted on the frame and rollers mounted in the free ends of the stripping fingers bearing on the cylinder in said grooves.

In testimony whereof I have signed my name to this specification in the presence of two subscribing witnesses.

DON P. CARR.

Witnesses:
ELSIE DICKINSON,
ETHA M. PATTEN.